United States Patent [19]

Miller et al.

[11] Patent Number: 5,194,227

[45] Date of Patent: Mar. 16, 1993

[54] MULTIPLE WYE CATALYTIC CRACKER AND PROCESS FOR USE

[75] Inventors: Charles B. Miller, Ashland; Howard F. Moore, Catlettsburg, both of Ky.

[73] Assignee: Ashland Oil, Inc., Ashland, Ky.

[21] Appl. No.: 770,205

[22] Filed: Oct. 2, 1991

[51] Int. Cl.$^5$ .............................................. B01J 8/26
[52] U.S. Cl. ..................................... 422/140; 208/74;
   208/78; 208/155; 208/164; 422/144; 422/145;
   422/147; 422/214
[58] Field of Search ............... 422/214, 144, 140, 145,
   422/146, 147; 208/78, 164, 155, 74

[56] References Cited

U.S. PATENT DOCUMENTS 3,186,805  6/1965  Gomory ..................... 422/214 X

*Primary Examiner*—Robert J. Warden
*Assistant Examiner*—Amalia Santiago
*Attorney, Agent, or Firm*—Richard C. Willson, Jr.

[57] ABSTRACT

The conventional wye (where the clean regenerated catalyst returns from the regenerator to contact the feed as it enters the riser) is replaced with two or more wyes, all connected between the regenerator outlet and the inlet to a common short cracking riser. Each wye has a separate injector which can inject; e.g., diesel oil, so that neat (unmixed) diesel contacts clean catalyst and the mixture rises up a smaller riser before entering a short main riser where the largely cracked mixture is admixed with similar cat-vacuum bottoms, etc. mixtures from the other wyes. Most cracking occurs before entering the common riser so the effect is similar to a riser cracker operating on a single unmixed feed.

9 Claims, 2 Drawing Sheets

MULTIPLE WYE CATALYTIC CRACKER AND PROCESS FOR USE

BACKGROUND OF THE INVENTION

I. Field of the Invention

The invention relates to cracking of hydrocarbons, generally classified in U.S. Patent Office, Class 208, subclasses 72, 73, 74, 113, 155, 157 and 164; and Class 422, subclasses 143-147.

II. Description of the Prior Art

Owen U.S. Pat. No. 3,886,060, FIG. 1, has a plurality of wyes or injectors 38' for introducing residual oil feeds 38 to the regenerated catalyst in the riser. FIG. 2 also shows a riser 27 which includes a plurality of wyes/injectors 37 for injecting oil into the riser to admix with regenerated catalyst 69.

Friedman U.S. Pat. No. 2,908,630 shows cracking apparatus including a reactor riser having a plurality of wyes or feeds for introducing oil to a freshly regenerated catalyst flowing within the riser. Three oil inlets 14a, 14b, and 14c are each fed oils having progressively greater coking factors.

Luckenbach U.S. Pat. No. 2,963,421 shows catalytic cracking apparatus having one or more feed nozzles 24 for feeding virgin unmixed gas oil to the riser.

Hettick U.S. Pat. No. 2,938,856 shows a riser 3 with a plurality of feeds 7-11 for introducing unmixed oil to a regenerated catalyst flowing within the riser.

Gomory U.S. Pat. No. 3,186,805 shows catalytic cracking apparatus in which regenerated catalyst and oil mixture is fed to the lower end of a riser at a plurality of locations.

James U.S. Pat. No. 3,964,876, FIG. 1, shows a three-stage riser 2 having a plurality of locations for feeding regenerated catalyst and including three zones 8, 9 and 10. The lower most zone has the smallest diameter and the upper most zone has the largest diameter.

Various other U.S. patents including Carr U.S. Pat. No. 3,639,228; Chou U.S. Pat. No. 4,578,183; and Buyan U.S. Pat. No. 4,650,566 disclose catalytic cracking apparatus having risers provided with at least three nozzles at their lower most region for introducing oil feeds to catalyst within the riser.

Various U.S. patents including Haunschild U.S. Pat. No. 4,417,974 and Mauleon U.S. Pat. No. 4,818,372 and U.S. Pat. No. 4,832,825 show cracking risers having two or more nozzles for feeding oils to the lower end of the riser.

None of the above patents teach, in combination, a multiple wye arrangement in which each wye has a short individual riser which is connected with a common (short) cracking riser so that neat feeds or unmixed feeds, e.g. diesel oil, contact clean regenerated catalyst before the catalyst enters the common riser. Since most cracking occurs before the individual oil-catalyst mixtures enter the common riser, the effect in the individual risers is similar to a riser cracker operating on a single unmixed feed. Thus the competitive cracking conventionally experienced when mixed feeds are cracked, is largely avoided.

SUMMARY OF THE INVENTION

I. General Statement of the Invention

According to the invention and the conventional wye (where the clean regenerated catalyst returns from the regenerator to contact the feed as it enters the riser) is replaced with two or more wyes, all connected between the regenerator outlet and the inlet to a common short cracking riser. Each wye has a separate injector which can inject; e.g., diesel oil, so that neat (unmixed) diesel contacts clean catalyst and the mixture rises up a smaller riser before entering a short main riser where the largely cracked mixture is admixed with similar cat-vacuum bottoms, etc. mixtures from the other wyes. Most cracking occurs before entering the common riser so the effect is similar to a riser cracker operating on a single unmixed feed.

It is a particular advantage of the present invention; the feed, e.g., diesel oil or vacuum bottoms, sees primarily clean catalyst because most cracking occurs before entering the common riser.

Additional catalyst can move through a catalyst feed riser unmixed with hydrocarbons so that this catalyst is fresh and clean when it contacts the largely cracked products in the bottom of the main riser. This catalyst feed riser can receive regenerated catalyst and may additionally receive make-up catalyst which can be new catalyst or catalyst which was freshly reconditioned; e.g., by chemical or magnetic separation means such as that taught in U.S. Pat. No. 4,406,773 to W. P. Hettinger, Jr.

Separate control valves can control the flow of catalyst and of feed material to each of the individual risers so that the flow rate in these risers need not be identical of that in the main riser, and can be the same or different from the flow rate in other individual risers.

In general, the contact time between catalyst and feed in each of the individual risers will be in the range of about 0.3 to about 20 seconds, more preferably from about 0.5 to about 5 seconds, and the contact time in the main (common) riser will be in the range of about 0.3 to about 20 seconds, more preferably from about 0.5 to about 10 seconds, and most preferably to about 1 to about 5 seconds. The catalyst to oil ratio can also be the same or different in the individual risers. Preferred cat:oil ratio will be in the range of about 1 to about 15, more preferably from about 2 to about 12, and most preferably to about 3 to about 10, but this can be varied widely in processing special feeds.

Thus, not only does each of the individual hydrocarbons "see" clean catalyst, uncontaminated by cracking the other hydrocarbons, but the specific contact times and cat:oil ratios can be specifically optimized for each of the individual feeds. This is in contrast to the general approach of mixing all of the feeds into a common riser where they contact the catalyst at once, and where all feeds must conventionally have the same contact time with the catalyst, regardless of what the optimum contact time would be for that particular feed.

Though attempts to vary the contact time have been used in the past; e.g., in multiple-injections risers, these devices did not allow for the optimization of cat:oil ratio for the individual feedstocks. Also, in these risers, feed materials saw only catalyst which had become contaminated by cracking the other components being fed to the same riser. It is an important feature of the present invention that most of the cracking of the individual components will occur in the individual risers so that, in effect, the present invention with minimum additional equipment investments provides, in effect, a series of smaller fluid catalytic cracking systems each of which can be optimized for the particular feedstock.

While the invention has been described in the example which follows in terms of cracking two feedstocks and using a third riser to add additional make-up catalyst, it should be understood that three or four or even five or six or more feedstocks and individual risers may be employed where desired. The number of risers will in general be limited only by the geometry and the considerations of catalyst flow so that the individual risers must each be large enough in diameter to provide good flow of catalyst, feed and cracked products into the main riser.

UTILITY OF THE INVENTION

The invention is useful for cracking hydrocarbons, preferably diesel oil and gas oils, but also, less preferably, for reduced crude (topped crude), vacuum resids, and other petroleum components and derivatives to produce products, preferably gasoline, kerosene, diesel oil, and other transportation fuels, plus No. 2 fuel oil, etc.

DESCRIPTION OF THE PREFERRED EMBODIMENTS

Example I

Figure 1:
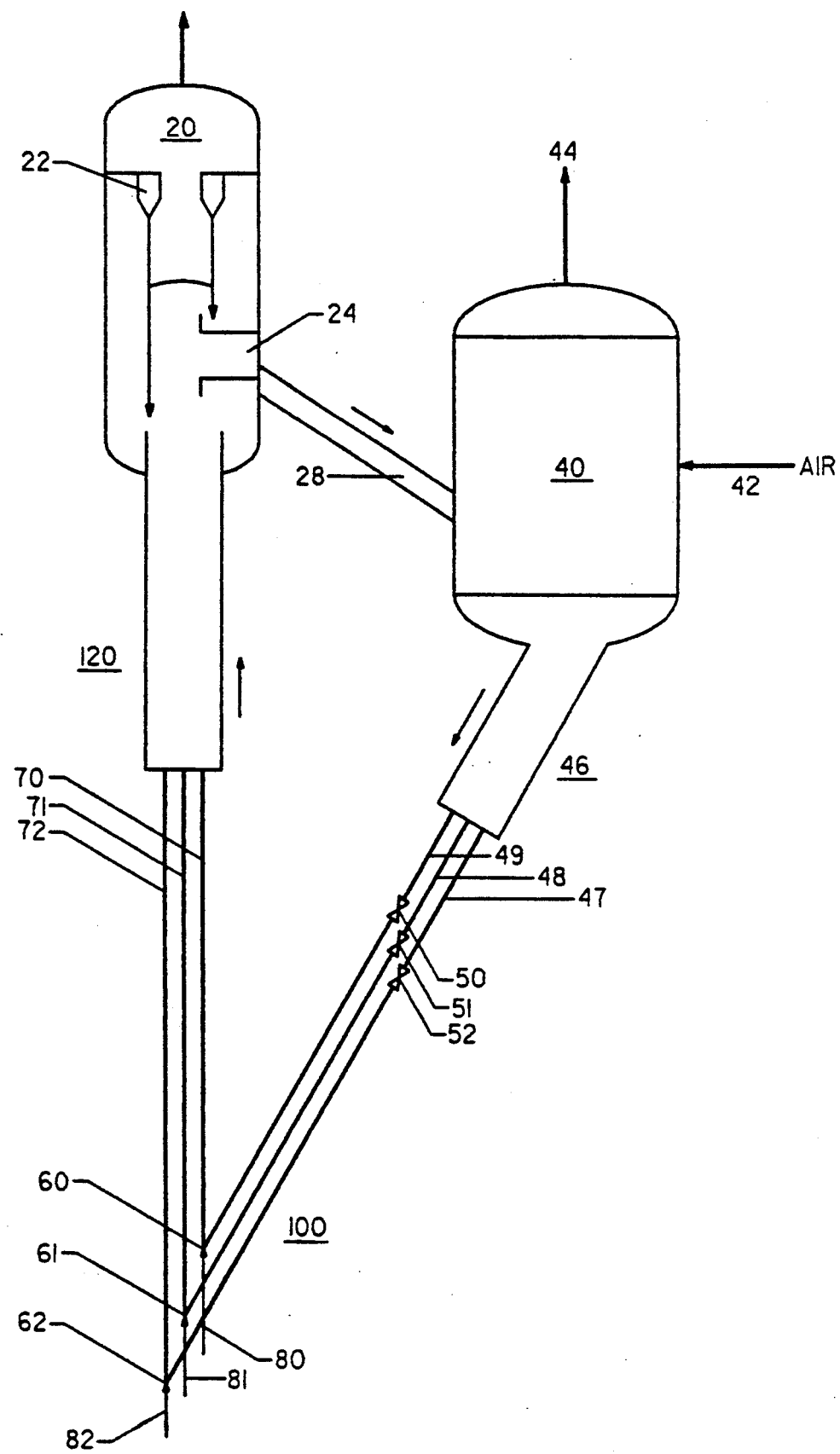
FIG. 1 is a schematic diagram of the invention as described in the example.

Referring to FIG. 1, a conventional catalyst collection system 20 comprises cyclone 22 and a vented riser catalyst-vaporized products separation device 24 such as that taught in U.S. Pat. Nos. 4,341,624 to G. D. Myers, 4,678,642 D. M. Lee, and 4,390,503 to P. W. Walters et al., together with a catalyst return line 28 which feeds coked catalyst to regenerator 40 where the catalyst is regenerated by removing the coke with air and fed through inlet 42, or carbon dioxide or carbon monoxide to produce flue gas 44 which is processed and then vented to atmosphere. Regenerated catalyst with at least most of the coke removed, moves downward through common catalyst return line 46 which ends in individual catalyst return lines 47, 48 and 49, controlled by control valves 50, 51 and 52, respectively. Individual catalyst return lines 47, 48 and 49 terminate in wyes 60, 61 and 62, respectively, and these are connected to individual risers 70, 71 and 72. This whole multiple-wye complex formed by the individual catalyst return lines 47-49 and individual risers 70-72, is termed the multiple-wye complex 100. Each of the individual wyes 60,61 and 62, are connected to feed inlets 80, 81 and 82, respectively.

Figure 2:
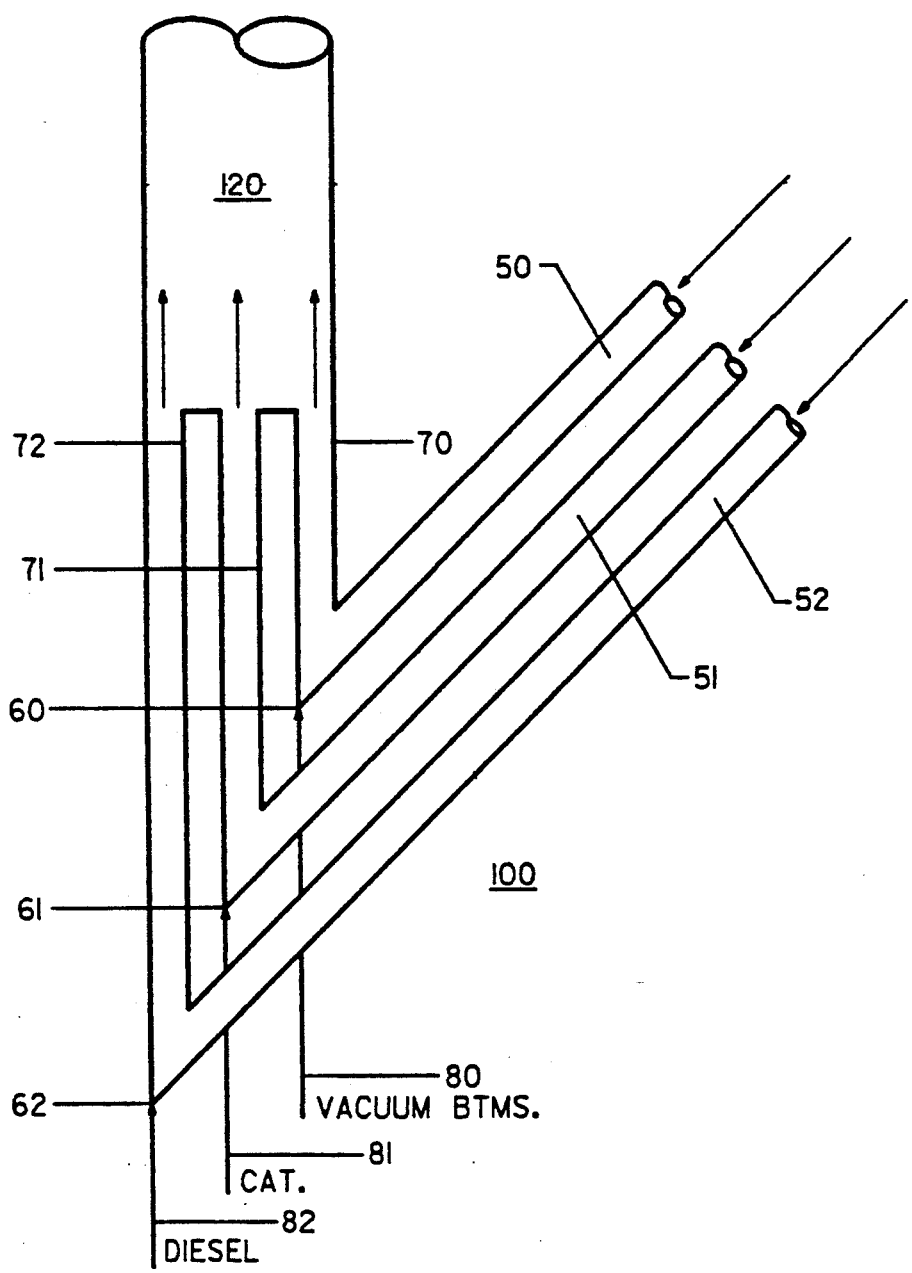
FIG. 2 is a detailed schematic diagram of the individual catalyst return tubes and individual risers which form individual wyes at which individual feeds are admitted.

FIG. 2 shows in greater detail the individual wyes 60, 61 and 62 and risers 70, 71 and 72. Though the risers are shown as being substantially different in length, in actual practice, the individual risers will be sufficiently long that the small differences in the height of their wyes 60, 61 and 62 will not substantially reduce the length of the individual risers.

In operation, diesel oil from a vacuum tower is injected into riser 80 and the flow of catalyst and the flow of vacuum bottoms are adjusted so that the cat:oil ratio is approximately 6.4 pounds of catalyst to each pound of diesel oil. Similarly, virgin kerosene is injected through feed 82 into wye 62 and up riser 72, and the amount of catalyst flowing down catalyst return line 52 is adjusted to provide a cat:oil ratio of about 6.4 pounds of catalyst per pound of kerosene. The individual risers are approximately 20 feet long and the greater portion of the desired cracking is obtained in the individual risers 70 and 72. Much of the catalyst in risers 70 and 72 is substantially coked by the time it reaches common riser 120, but additional new make-up catalyst is injected through injections point 81 into wye 61 and up through riser 71 to provide additional cracking ability as the mixed feed/catalyst mixture moves upward through common riser 120. At the top of riser 120, the catalyst is sharply separated from the cracked products in separator 24 and recovered by cyclone 22 to return through line 28 to be conventionally regenerated in regenerator 40. Regenerated catalyst returns through common return line 46 into individual return lines 47, 48 and 49 to repeat the cycle.

Yields are excellent and selectivity is especially improved by the optimization of the cracking step conditions for each of the individual components fed. Catalyst life is also improved and coking is reduced again by the ability to optimize the individual cracking conditions which the individual feeds undergo.

EXAMPLE II

Laboratory fixed fluidized bed tests are used to simulate the effects of separate versus blended processing. Tests are performed at 980° F. and 6.4 catalyst:oil ratio, with 5% steam added as a diluent over a commercial equilibrium FCC catalyst. In this case virgin diesel (36.3° API, 0.5% sulfur, 26 ppm basic nitrogen, and a 557° F. 50% point by simulated distillation) and hydrotreated bulk distillate (24.6° API, 0.6% sulfur, 230 ppm basic nitrogen, 0.85% Ramsbottom Carbon, with a 50 wt. % mid-boiling point of 849° F. by simulated distillation) are evaluated.

TABLE I

|  | Experimental | | | Calculated |
| --- | --- | --- | --- | --- |
| Feed Type<br>Feed<br>Designation | Hydrotreated<br>Bulk<br>Distillate<br>HTBD | Virgin<br>Diesel<br>VD | 70%<br>HTBD +<br>30% VD<br>Blend | 70%<br>HTBD +<br>30% VD<br>Blend |
| Test<br>Reference,<br>PDU-<br>Yields, wt %: | 942 | 938 | 1052 | (942 + 938) |
| Hydrogen | 0.17 | 0.04 | 0.12 | 0.13 |
| Methane | 0.61 | 0.21 | 0.45 | 0.49 |
| C2's | 0.94 | 0.47 | 0.79 | 0.80 |
| C3's | 4.51 | 3.04 | 3.97 | 4.07 |
| C4's | 11.33 | 10.68 | 8.46 | 11.14 |
| C5-430° F. | 56.44 | 61.55 | 57.38 | 57.97 |
| 430–630° F. | 13.38 | 16.56 | 16.29 | 14.33 |
| 630° F.+ | 5.99 | 3.7 | 6.36 | 5.30 |
| Coke | 6.4 | 3.4 | 5.86 | 5.50 |
| Conversion | 80.63 | 79.74 | 77.35 | 80.36 |

All yields are normalized weight percent, with the residuals not shown being acid gases ($H_2S$, COS, CO, $CO_2$).

It is readily seen that the actual blend exhibits lower conversion than either of the individual feeds processed separately. Further, when the combined (calculated) yields of the individual components are compared to yields of the blends, very positive trends are revealed— more gasoline, more C4-630° F. transportation fuels, higher conversion, and lower coke.

EXAMPLE III

In this example, laboratory yields are developed as in Example II but for lube plant slack wax and the hydrotreated bulk distillate from Example II. The 36.8° API slack wax (50% point by sim-D of 871° F.) cracks very readily as an individual feed, Table II.

TABLE II

| | Experimental | | | Calculated |
|---|---|---|---|---|
| Feed Type<br>Feed<br>Designation | Hydrotreated<br>Bulk<br>Distillate<br>HTBD | Virgin<br>Diesel<br>Slack<br>Wax | 70%<br>HTBD +<br>30% Slack<br>Wax Blend | 70%<br>HTBD +<br>30% Slack<br>Wax Blend |
| Test<br>Reference,<br>PDU- | 942 | 940 | 1057 | (1057 +<br>938) |
| Yields, wt %: | | | | |
| Hydrogen | 0.17 | 0.07 | 0.16 | 0.14 |
| Methane | 0.61 | 0.4 | 0.65 | 0.55 |
| C2's | 0.94 | 0.72 | 1.03 | 0.87 |
| C3's | 4.51 | 6.4 | 5.5 | 5.08 |
| C4's | 11.33 | 18.85 | 11.75 | 13.59 |
| C5-430° F. | 56.44 | 61.4 | 57.48 | 57.93 |
| 430-630° F. | 13.38 | 5.15 | 11.78 | 10.91 |
| 630° F.+ | 5.99 | 1.61 | 5.58 | 4.68 |
| Coke | 6.4 | 5.17 | 5.75 | 6.03 |
| Conversion | 80.63 | 93.24 | 82.64 | 84.41 |

In combination with the hydrotreated bulk distillates, however, overall yields and conversion are suppressed. 1.4% more transportation fuels ($C_4$-630° F.) are produced by separate processing than in blend.

MODIFICATIONS

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference made in the other specification is intended to result in such patents or literature being expressly incorporated herein by reference including any patents or their literature references cited within such patents.

What is claimed is:

1. In a hydrocarbon cracking process comprising cracking in a cracking riser in which catalyst and hydrocarbon feed are intermixed under cracking conditions, separating in a separator cracked products from catalyst which has become coked during the cracking step, and removing said coke from said catalyst by oxidation in a regenerator, transporting said catalyst from said regenerator to said riser, contacting said hydrocarbon in said riser, thereafter separating said catalyst from cracked products in said separator and recycling to said regenerator, the improvement comprising in combination:

a. providing a cracking common riser in communication with a separator, and in communication with a regenerator by means of a plurality of parallel catalyst return lines connected to respective individual parallel cracking risers which are connected to said regenerator, said plurality of parallel cracking risers being connected to said common cracking riser, and said separator being in fluid communication with said regenerator, b. injecting into each of said individual risers a respective hydrocarbon feed at a point between said regenerator and said common riser;

whereby each of said hydrocarbon feeds is intermixed with freshly regenerated catalyst from said regenerator; and wherein at least some of said feeds are different in composition from other of said feeds, and wherein substantial cracking takes place in said individual parallel cracking risers prior to each individual mixture of oil and catalyst entering said common riser.

2. Fluid catalytic cracking apparatus, comprising:

a. a plurality of individual cracking risers, b. a common vertical cracking riser having an inlet end and an outlet end, c. multiple wye arrangements in which each wye has one of said individual cracking risers connected thereto, said cracking risers each having an outlet each outlet being in fluid communication with the inlet end of said common vertical cracking riser so that individual feeds flowing through said individual risers are substantially cracked in the presence of regenerated clean catalyst in said individual risers and, thereafter, the catalysts enter said common riser, thus substantially avoiding competitive cracking conventionally experienced when mixed feeds are cracked, and d. a regenerator in fluid communication with, and for receiving coked catalyst from, the outlet end of said common riser, said regenerator being fluidly connected to each of said wye arrangements for feeding said clean regenerated catalyst thereto to contact more of said individual feeds.

3. A process according to claim 1, wherein at least one of said feeds comprises diesel oil.

4. A process according to claim 1, wherein at least one of said feed comprises kerosene.

5. A process according to claim 1, wherein at least one of said feed comprises hydrotreated bulk distillates.

6. A process according to claim 1, wherein at least one of said feeds comprises lube plant slack wax.

7. A process according to claim 1, wherein contact time between the catalyst feed in each of said individual risers is from about 0.3 to 20 seconds, and wherein the contact time in the common riser is in the range from about 0.3 to about 20 seconds, and wherein the catalyst: oil ratio in each of the individual risers is in the range of about 1 to about 15.

8. A process according to claim 1 wherein at least one of said feeds comprises diesel oil and at least one of said feeds comprises kerosene and wherein the contact time between the catalyst feed at each of said individual risers is from about 0.3 to 20 seconds and wherein the contact time of the common riser is in the range from about 0.3 to about 20 seconds and wherein the catalyst: oil ratio in each of the individual risers is in the range of about 1 to about 15.

9. A process according to claim 8 wherein said contact time in said individual risers is about 0.5 to about 5 seconds, and said contact time in said individual risers is common about 1 to 5 seconds, and said catalyst oil ratio is from about 3 to 10.

* * * * *